US012198920B2

(12) United States Patent
Nishiguchi et al.

(10) Patent No.: US 12,198,920 B2
(45) Date of Patent: Jan. 14, 2025

(54) ION ANALYZER

(71) Applicant: SHIMADZU CORPORATION, Kyoto (JP)

(72) Inventors: Masaru Nishiguchi, Kyoto (JP); Akiko Imazu, Kyoto (JP); Osamu Furuhashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 62 days.

(21) Appl. No.: 17/697,045

(22) Filed: Mar. 17, 2022

(65) Prior Publication Data

US 2022/0375739 A1 Nov. 24, 2022

(30) Foreign Application Priority Data

May 19, 2021 (JP) ................................ 2021-084743
Jan. 5, 2022 (JP) ................................ 2022-000507

(51) Int. Cl.
*H01J 49/26* (2006.01)
*H01J 49/00* (2006.01)
*H01J 49/16* (2006.01)

(52) U.S. Cl.
CPC ........ *H01J 49/167* (2013.01); *H01J 49/0031* (2013.01); *H01J 49/26* (2013.01)

(58) Field of Classification Search
CPC ...... H01J 49/167; H01J 49/0031; H01J 49/26; G01N 27/622; G01N 30/72
USPC ........................................ 250/281, 282, 288
See application file for complete search history.

(56) References Cited

U.S. PATENT DOCUMENTS 8,207,496 B2 6/2012 Makarov et al.
8,242,441 B2 * 8/2012 Wouters ................ H01J 49/167 250/281
2009/0056133 A1 * 3/2009 Waits .................... B05B 5/0255 29/890.143
2009/0230296 A1 * 9/2009 Kelly .................... H01J 49/167 250/281
2015/0060566 A1 3/2015 Nakano

FOREIGN PATENT DOCUMENTS

JP 2012-058122 A 3/2012
JP 2015-049077 A 3/2015

* cited by examiner

*Primary Examiner* — Michael Maskell
(74) *Attorney, Agent, or Firm* — Sughrue Mion, PLLC

(57) ABSTRACT

In order to improve the ionization efficiency and ion collection efficiency in an ESI ion source to achieve a higher level of analysis sensitivity while improving the throughput of the analysis, one mode of the present invention provides an ion analyzer equipped with an ion source employing an electrospray ionization method, where the ion source (2) includes: a plurality of capillaries (211-218) configured to spray a supplied liquid sample in the same direction; one or more auxiliary electrodes (23, 231-328) arranged so as to be surrounded by the plurality of capillaries; and a voltage supplier (24) configured to apply, to the plurality of capillaries, a DC high voltage for which the potential of the one or more auxiliary electrodes is used as a reference.

10 Claims, 7 Drawing Sheets

ION ANALYZER

TECHNICAL FIELD

The present invention relates to an ion analyzer including a mass spectrometer and an ion mobility spectrometer. More specifically, it relates to an ion analyzer including an ion source which employs an electrospray ionization (ESI) method.

BACKGROUND ART

In a liquid chromatograph mass spectrometer (which is hereinafter abbreviated as the "LC-MS") which uses a mass spectrometer as the detector for a liquid chromatograph (LC), an ion source which employs an atmospheric pressure ionization method for ionizing a compound in a liquid sample under atmospheric pressure is used. Among the atmospheric pressure ionization methods, the most representative one is the ESI method. An ion source employing the ESI method is hereinafter called the "ESI ion source".

As disclosed in Patent Literature 1 or other related documents, an ESI ion source includes a thin, electrically conductive capillary and a cylindrical gas tube concentrically arranged with the capillary so as to surround that same capillary. A DC high voltage is applied to the capillary while a liquid sample is also supplied to the capillary, whereby electric charges are imparted to the liquid sample due to the electric field created around the tip of the capillary. With the help of the nebulizing gas spouted from the gap between the outer circumference of the capillary and the inner circumference of the gas tube, the liquid sample is ejected from the tip of the capillary in the form of charged droplets. These charged droplets come in contact with the surrounding gas molecules and are thereby atomized, whereby the solvent (containing the mobile phase used in the liquid chromatograph) in the droplets is vaporized. During this process, the compound molecules in the charged droplets are turned into ions and ejected from the droplets. In this manner, the ESI ion source can ionize compounds contained in a liquid sample.

In order to improve the ionization efficiency, a commonly known ESI ion source is configured to promote the atomization of the charged droplets and the vaporization of the solvent by blowing a heated inert gas onto the spray flow of the charged droplets in addition to the nebulizing gas.

CITATION LIST

Patent Literature

Patent Literature 1: JP 2015-49077 A
Patent Literature 2: JP 2012-58122 A
Patent Literature 3: US 2009/0230296 A
Patent Literature 4: U.S. Pat. No. 8,207,496 B

SUMMARY OF INVENTION

Technical Problem

In recent years, there has been the tendency that the flow rate of the mobile phase supplied to the column in the liquid chromatograph in an LC-MS is increased in order to improve the throughput of the analysis. This is accompanied by an increase in the amount of liquid sample supplied to the ion source in the mass spectrometer. However, conventionally and commonly used ESI ion sources cannot always deal with such an increase in the amount of liquid supply. In some cases, increasing the amount of liquid supply may cause problems, such as a decrease in the ionization efficiency.

As an ESI ion source capable of dealing with an increase in the amount of supply of the liquid sample, an ESI ion source having a structure as disclosed in Patent Literatures 2-4 has been known in which a plurality of capillaries are provided in a bundled form, and a liquid sample supplied through a sample supply tube is distributed to those capillaries. This type of ion source can decrease the amount of liquid sample supplied to each single capillary. In principle, this type of conventional ESI ion source should be able to atomize charged droplets and improve the ionization efficiency. However, as a practical matter, this technique does not significantly improve the analysis sensitivity.

The present invention has been developed to solve this problem. Its objective is to provide an ion analyzer which can ensure a high level of ionization efficiency and improve the analysis sensitivity even when the amount of supply of the liquid sample is increased.

Solution to Problem

One mode of the ion analyzer according to the present invention is an ion analyzer equipped with an ion source employing an electrospray ionization method, where the ion source includes:

- a plurality of capillaries configured to spray a supplied liquid sample in the same direction;
- one or more auxiliary electrodes arranged so as to be surrounded by the plurality of capillaries; and
- a voltage supplier configured to apply, to the plurality of capillaries, a DC high voltage for which the potential of the one or more auxiliary electrodes is used as a reference.

Another mode of the ion analyzer according to the present invention is an ion analyzer equipped with an ion source employing an electrospray ionization method, where the ion source includes:

- a plurality of capillaries configured to spray a supplied liquid sample in the same direction;
- one or more auxiliary electrodes arranged so as to surround the plurality of capillaries; and
- a voltage supplier configured to apply, to the one or more auxiliary electrodes, a DC high voltage for which the potential of the plurality of capillaries is used as a reference.

Advantageous Effects of Invention

In the ion analyzers according to the previously described modes of the present invention, a liquid sample containing a component to be analyzed is distributed to a plurality of capillaries, and electrically charged droplets are sprayed from each capillary. Accordingly, in the ion analyzers according to the previously described modes of the present invention, the total amount of liquid sample to be introduced into the ion source can be increased, whereby the throughput of the analysis can be improved. Alternatively, the amount of liquid sample to be passed through one capillary can be decreased, whereby the sprayed droplets can be atomized, and the generation of the ions can be promoted.

In the ion analyzers according to the previously described modes of the present invention, since the electric field around the tip of the capillary is strengthened, the charge-induced splitting of the liquid sample which has reached the tips of the capillaries is promoted, and the ionization efficiency is thereby improved. Simultaneously, due to the effect of the electric field created by the auxiliary electrode, the charged droplets sprayed from the capillaries and the ions generated from those droplets are prevented from spreading; conversely, they are converged as they move forward. Therefore, the generated ions are more likely to be introduced, for example, into a transport tube which transports ions into a vacuum chamber, so that the ion collection efficiency is improved. Consequently, the amount of ions subjected to the analysis increases, and a high level of analysis sensitivity is achieved.

DESCRIPTION OF EMBODIMENTS

The ion analyzer according to the present invention includes mass spectrometers, ion mobility spectrometers, and ion mobility mass spectrometers which are combinations of the previously mentioned devices. The ion source in the ion analyzer according to the present invention is an ESI ion source. All elements of the configuration except for the ion source, such as the technique for the mass separation in the mass spectrometer or the presence/absence of an ion-dissociating operation and the type of dissociation technique, can be appropriately selected.

First Embodiment

A mass spectrometer as one embodiment of the ion analyzer according to the present invention is hereinafter described with reference to the attached drawings.

Figure 1:
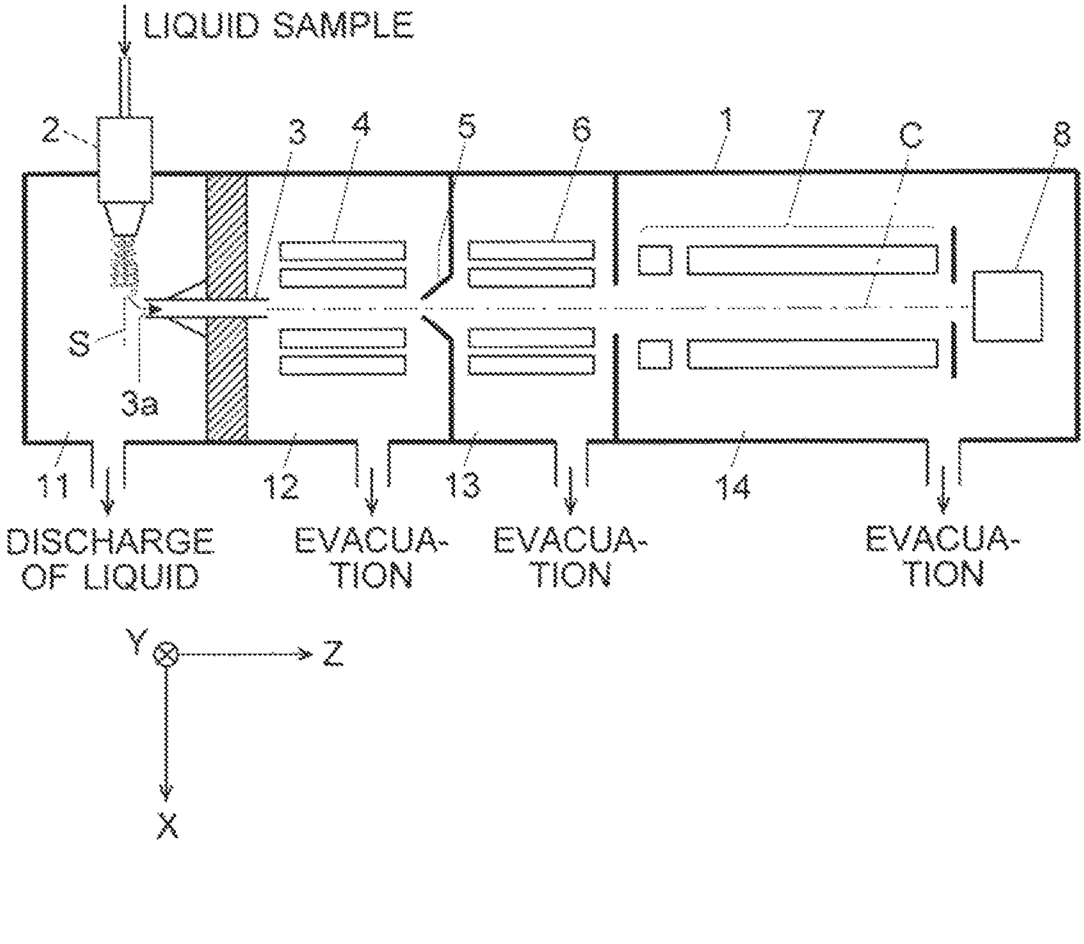
FIG. 1 is an overall configuration diagram of a mass spectrometer as one embodiment of the present invention.
Figure 2B:
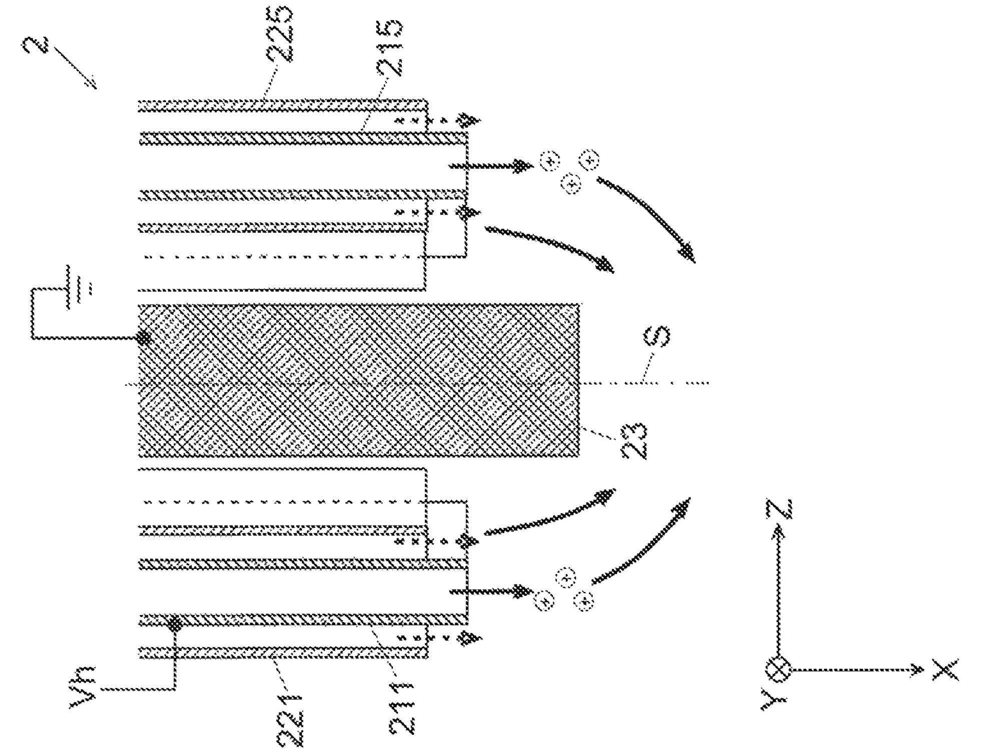
FIG. 2B is a sectional view at line A-AA in FIG. 2A.
Figure 2A:
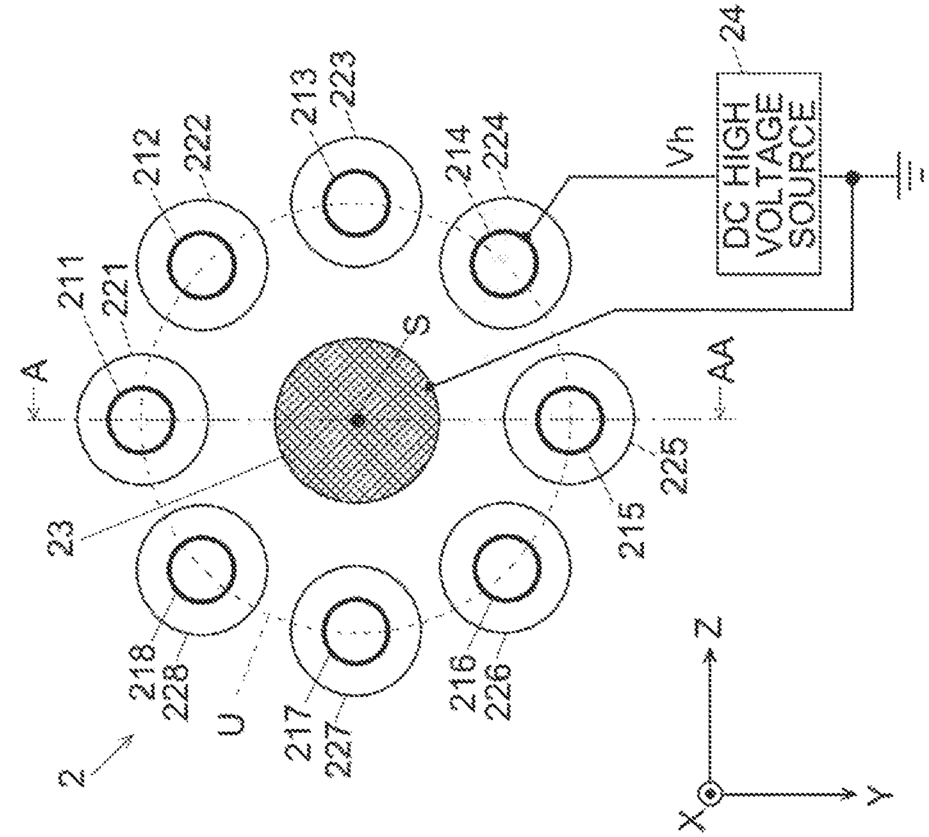
FIG. 2A is a front view of an ESI ion source in the mass spectrometer according to the present embodiment.

FIG. 1 is an overall configuration diagram of the mass spectrometer according to the present embodiment. FIG. 2A is a front view showing the configuration of the ESI ion source in the mass spectrometer, and FIG. 2B is a sectional view at line A-AA in FIG. 2A.

The present mass spectrometer is a single-type atmospheric pressure ionization quadrupole mass spectrometer. For convenience of explanation, three axes of X, Y and Z which are orthogonal to each other are defined in the space, as shown in FIGS. 1, 2A and 2B.

As shown in FIG. 1, the chamber 1 in the mass spectrometer according to the present embodiment is divided into four sections: an ionization chamber 11, first intermediate vacuum chamber 12, second intermediate vacuum chamber 13 and analysis chamber 14. The ionization chamber 11 is at substantially atmospheric pressure, while the analysis chamber 14 is maintained in a high-vacuum state by evacuation using a high-performance vacuum pump (not shown, which is normally a combination of a turbomolecular pump and a rotary pump). The first and second intermediate vacuum chambers 12 and 13 are also individually evacuated by vacuum pumps. Thus, a multi-pumping system in which the degree of vacuum increases from the ionization chamber 11 to the analysis chamber 14 in a stepwise manner is constructed.

Within the ionization chamber 11, an ESI probe 2 for ionization is provided as the ion source. A liquid sample containing sample components is sprayed in the form of charged droplets from the ESI probe 2 in a roughly X-axis direction. The charged droplets sprayed from the ESI probe 2 come in contact with the gas in the ionization chamber 11 and are thereby atomized. Additionally, the droplets also shrink due to active vaporization of the solvent from the droplets. During that process, the sample components in the droplets are ejected in an electrically charged state and turned into ions.

The ionization chamber 11 communicates with the first intermediate vacuum chamber 12 through a thin desolvation tube 3. The central axis of the ion intake 3*a*, which is the opening of the desolvation tube 3 in the ionization chamber 11 extends substantially parallel to the Z axis. In other words, the direction of spray from the EST probe 2 is substantially orthogonal to the central axis of the ion intake 3*a* (i.e., the direction in which ions are drawn). Due to the pressure difference between the two open ends of the desolvation tube 3, a flow of gas from the ionization chamber 11 into the first intermediate vacuum chamber 12 through the desolvation tube 3 is formed. The ions generated from the sample components within the ionization chamber 11 are mainly carried by this flow of gas and drawn through the ion intake 3*a* into the desolvation tube 3, to be ejected into the first intermediate chamber 12 along with the flow of gas.

The first intermediate vacuum chamber 12 contains a multipole ion guide 4. A skimmer 5 having a small hole at its apex is provided in the partition wall which separates the first and second intermediate vacuum chambers 12 and 13 from each other. Due to the effect of the electric field created by the ion guide 4, the ions are converged into the vicinity of the small hole in the skimmer 5 and sent into the second intermediate vacuum chamber 13 through that same hole.

The second intermediate vacuum chamber 13 also contains a multipole ion guide 6. Due to the effect of the electric field created by this ion guide 6, the ions are converged and sent into the analysis chamber 14. The analysis chamber 14 contains a quadrupole mass filter 7 and an ion detector 8. The ions are introduced along the ion beam axis C into the space extending the longitudinal direction of the quadrupole mass filter 7. Due to the effect of the electric field created by voltages applied to the quadrupole mass filter, only an ion having a specific mass to charge ratio is allowed to pass through the quadrupole mass filter 7 and reach the ion detector 8. The ion detector 8 produces a detection signal corresponding to the amount of ions which have reached the detector. This signal is sent to a data processing unit (not shown). In this mass spectrometer, the analysis sensitivity can be improved by increasing the amount of ions sent into the quadrupole mass filter 7 and subjected to the analysis.

Next, the configuration of the ESI probe 2 is described in detail with reference to FIGS. 2A and 2B.

FIG. 2A shows the ESI probe 2 as viewed from a front area in the direction of the spray flow of the charged droplets. FIG. 2B is a sectional view at line A-AA in FIG. 2A.

As shown in FIG. 2A, the ESI probe 2 includes eight electrically conductive capillaries 211-218 arranged on the same circle U at substantially regular intervals of angle (in the present example, at angles of 45 degrees) and extending parallel to the axis S of the circle. For each of the eight capillaries 211-218, a cylindrical nebulizing-gas tube 221-228 is provided, with each tube forming a concentric double-tube structure with the corresponding capillary 211-218. The ESI probe 2 further includes an auxiliary electrode 23 having a columnar shape located on, and extending parallel to, the axis S which corresponds to the center of the circle U on which the eight capillaries 211-218 are arranged. The end of the auxiliary electrode 23 protrudes from those of the capillaries 211-218 in the X-axis direction.

That is to say, the single auxiliary electrode 23 is arranged so as to be surrounded by the eight capillaries 211-218 in the ESI probe 2. The eight capillaries 211-218 are at roughly equal distances from the auxiliary electrode 23. The configuration of one capillary and one nebulizing-gas tube forming a double-cylinder structure with that capillary is equivalent to that of the capillary and the nebulizing-gas tube in a conventionally and commonly used ESI probe.

The auxiliary electrode 23 is grounded and has a fixed potential of zero. To each capillary 211-218, a DC high voltage equal to or higher than several kV, for example, is applied from a DC high voltage source 24. The polarity of this voltage is identical to that of the ion which is the measurement target; when the measurement target is a positive ion, a positive DC high voltage Vh is applied to the capillaries 211-218 (it should be noted that only the voltage application line connected to one capillary 214 is shown in FIG. 2A in order to prevent the drawing from being overly complex).

The ion-generating operation in the ESI probe 2 is hereinafter described. As an example, it is hereinafter assumed that the measurement target is a positive ion.

Though not shown, a liquid sample containing a compound isolated by a column in a liquid chromatograph, for example, is supplied to the ESI probe 2. This liquid sample is distributed to the eight capillaries 211-218 in approximately equal quantities and reaches the tips of the capillaries 211-218. Meanwhile, an appropriate kind of inert gas which acts as the nebulizing gas is supplied to the nebulizing-gas tube 221-228.

When a positive high voltage is applied to the capillaries 211-218, a strong electric field is created around the tip of each capillary 211-218 due to the potential difference between the auxiliary electrode 23 having a potential of zero and the capillaries 211-218. In a common type of ESI ion source, the potential which serves as the reference for the capillary's potential (typically, the ground potential) is the potential at or near the entrance end of the desolvation tube 3 in FIG. 1. By comparison, in the mass spectrometer according to the present embodiment, the auxiliary electrode 23 having the ground potential which serves as the reference is located close to the capillaries 211-218. Therefore, the electric field created around the tip of each capillary 211-218 is strong, and this electric field produces a strong Coulomb repulsion force acting inside the charged droplets formed at the tip of each capillary 211-218. This helps the atomization of the charged droplets. Consequently, with the help of the nebulizing gas, a large amount of charged droplets is sprayed from the capillaries 211-218.

Since multiple capillaries are present and the auxiliary electrode having the reference potential is arranged close to those capillaries, a large amount of charged droplets is sprayed. However, since those charged droplets have the same polarity, a Coulomb repulsion force acts between the charged droplets. Therefore, if there were no influence from an external electric field, the spray flow of the charged droplets would spread in a direction orthogonal to the axis of the spray flow as the droplets move forward, so that it would be difficult to draw ions generated from the charged droplets into the desolvation tube 3.

By comparison, in the mass spectrometer according to the present embodiment, since the potential of the auxiliary electrode 23 located on the axis S is lower than that of the surrounding capillaries 211-218, a potential gradient directed from the surrounding area toward the axis S is formed in a plane orthogonal to the axis S (Y-Z plane). That is to say, a converging electric field in which positively charged particles (droplets and ions) are converged into an area around the axis S is formed within an area in front of the tips of the capillaries 211-218. Due to this converging electric field, the charged droplets sprayed from the capillaries 211-218 and the ions generated from those droplets undergo a force which makes the droplets and ions move toward the axis S, as indicated by the thick arrows in FIG. 2B. Thus, the spray flow containing the charged droplets and ions is prevented from spreading due to the Coulomb repulsion force, so that the ions generated from the spray flow are efficiently drawn into the desolvation tube 3.

As described to this point, the auxiliary electrode 23 in the mass spectrometer according to the present embodiment produces the effect of strengthening the electric field around the tips of the capillaries 211-218 and the effect of converging the spray flow containing the charged droplets and ions into an area around the axis S. Thus, by using the ESI probe 2, it is possible to improve the ionization efficiency and generate a greater amount ions, as well as improve the ion collection efficiency to more efficiently introduce the generated ions into the desolvation tube 3 and send them to the subsequent stage.

First Modified Example of First Embodiment

Figure 3:
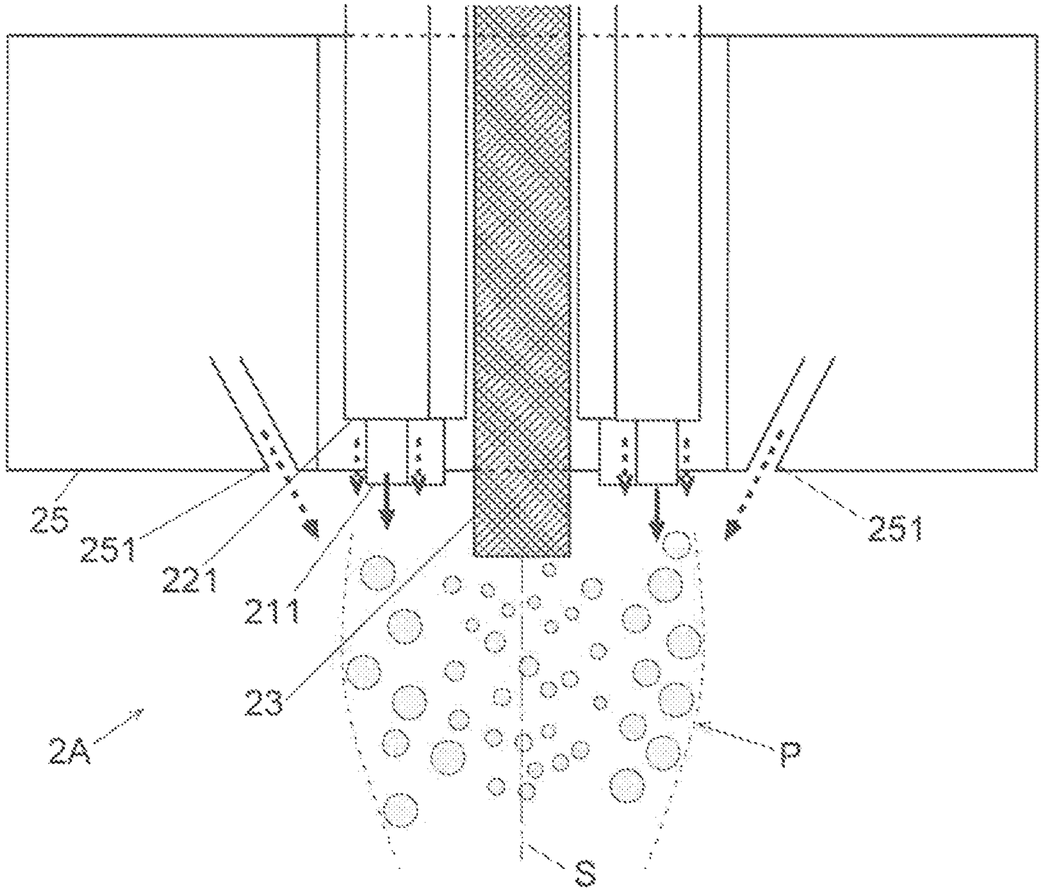
FIG. 3 is a configuration diagram showing a modified example of the ESI ion source shown in FIGS. 2A and 2B.
Figure 4:
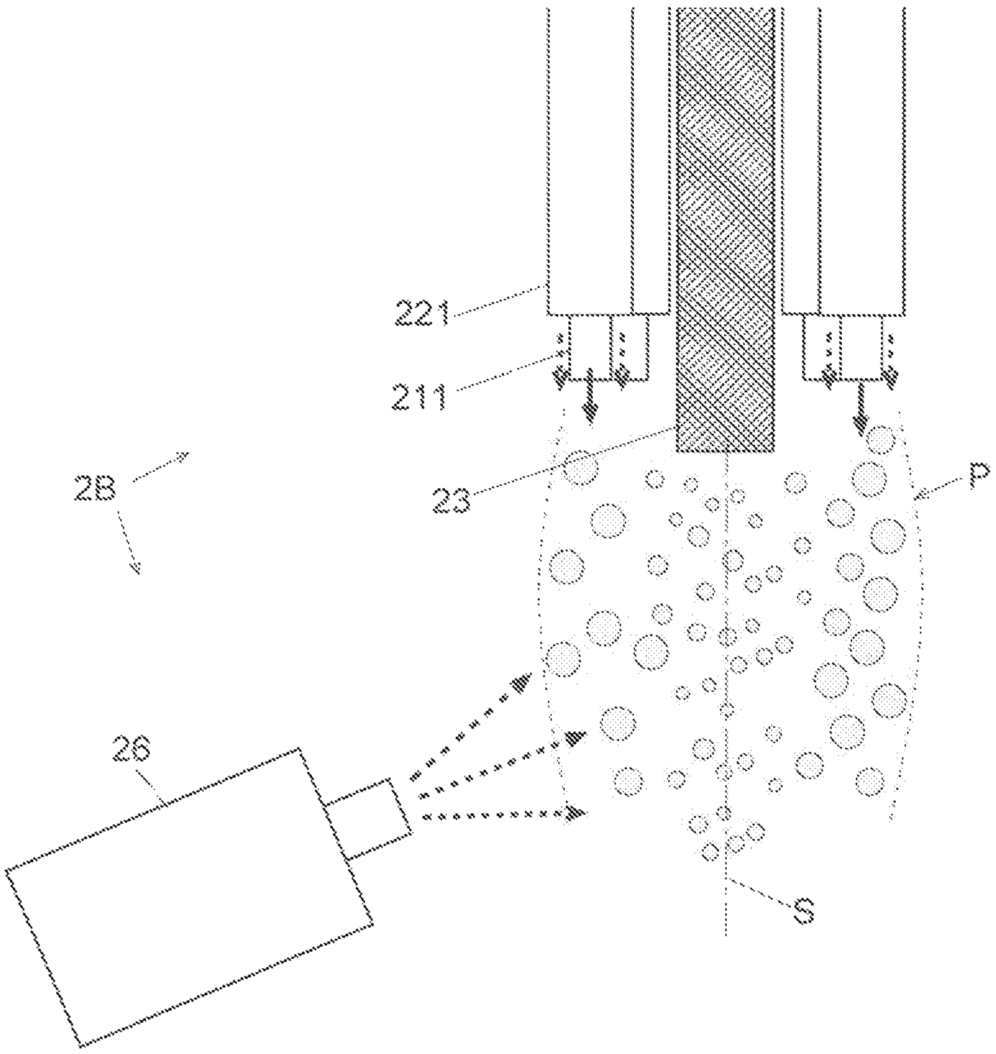
FIG. 4 is a configuration diagram showing another modified example of the ESI ion source shown in FIGS. 2A and 2B.

Each of FIGS. 3 and 4 shows one modified example of the ESI probe 2 in the mass spectrometer according to the previously described embodiment. It should be noted that the capillaries 211-218 and the nebulizing-gas tubes 221-228, which are only partially shown in FIGS. 3 and 4, are identical in configuration to those shown in FIG. 2.

The ESI probe 2A shown in FIG. 3 includes a doughnut-shaped heating-gas supplier 25 arranged so as to surround the capillaries 211-218. The heating-gas supplier 25 has a heating-gas spouting port 251 continuously extending along the entire circumference around the axis S, or heating-gas spouting ports 251 arranged at predetermined intervals of angle around the axis S. The heating-gas spouting port 251 is inclined inwards so that the spouted gas will travel toward the axis S. Therefore, the heating gas spouted from the heating-gas spouting port 251 surrounds the spray flow of the charged droplets and hits the outer circumferential portion of the same flow.

In the ESI probe the distribution of the droplets in the spray flow P will be such that a charged droplet having a lower mobility, i.e., a larger size, is located closer to the outer circumferential portion of the spray flow P due to the effects of both the previously described converging electric field created by the auxiliary electrode 23 and the nebulizing-gas flow spouted from the nebulizing-gas tubes 221-228. In a large-sized charged droplet, the Coulomb repulsion force acts inside the droplet less effectively, so that the atomization progresses rather slowly, and the ionization efficiency is difficult to improve.

On the other hand, the heating gas spouted from the heating-gas spouting port 251 efficiently hits the large-sized charged droplets located in the outer circumferential portion of the spray flow P. This gas helps the vaporization of the solvent in those charged droplets and thereby promotes the atomization of the droplets and the generation of ions. Thus, the ESI probe 2A according to the present modified example can further improve the ionization efficiency.

The ESI probe 2B shown in FIG. 4 includes a heating-gas supplier 26 which spouts the heating gas across the spray flow P of the charged droplets coming from the capillaries 211-218. This configuration also enables the heating gas to efficiently hit the large-sized charged droplets located in the outer circumferential portion of the spray flow P and promote the vaporization of the solvent from the charged droplets.

Second Modified Example of First Embodiment

In the ESI probes 2, 2A and 2B in the mass spectrometer according to the previously described embodiment, the plurality of capillaries 211-218 are arranged at substantially regular intervals of angle on substantially the same circle U. Accordingly, the charged droplets are sprayed in roughly equal quantities in the circumferential direction around the auxiliary electrode 23. However, the amounts of ions generated from the sprayed charged droplets and drawn into the desolvation tube 3 are less likely to be uniform in the circumferential direction around the auxiliary electrode 23. One reason for this problem is that the partition wall separating the desolvation tube 3 and the ionization chamber 11 from the first intermediate vacuum chamber 12 has a potential equal or close to the ground potential (or a potential which is at least significantly closer to the ground potential than that of the capillaries 211-218), so that the ion generation efficiency in a spray flow from a capillary located close to the desolvation tube 3 or the partition wall is relatively low. Another reason is that, although the electric field created by the auxiliary electrode 23 certainly has the converging effect, the charged droplets sprayed from the ESI probe 2 and the ions generated from those droplets are not converged into a beam-like form, so that the ions generated from a spray flow from a capillary located close to the desolvation tube 3 (in FIG. 1, the capillary located in the positive direction of the Z axis) are less likely to be drawn into the desolvation tube 3.

Figure 5A:
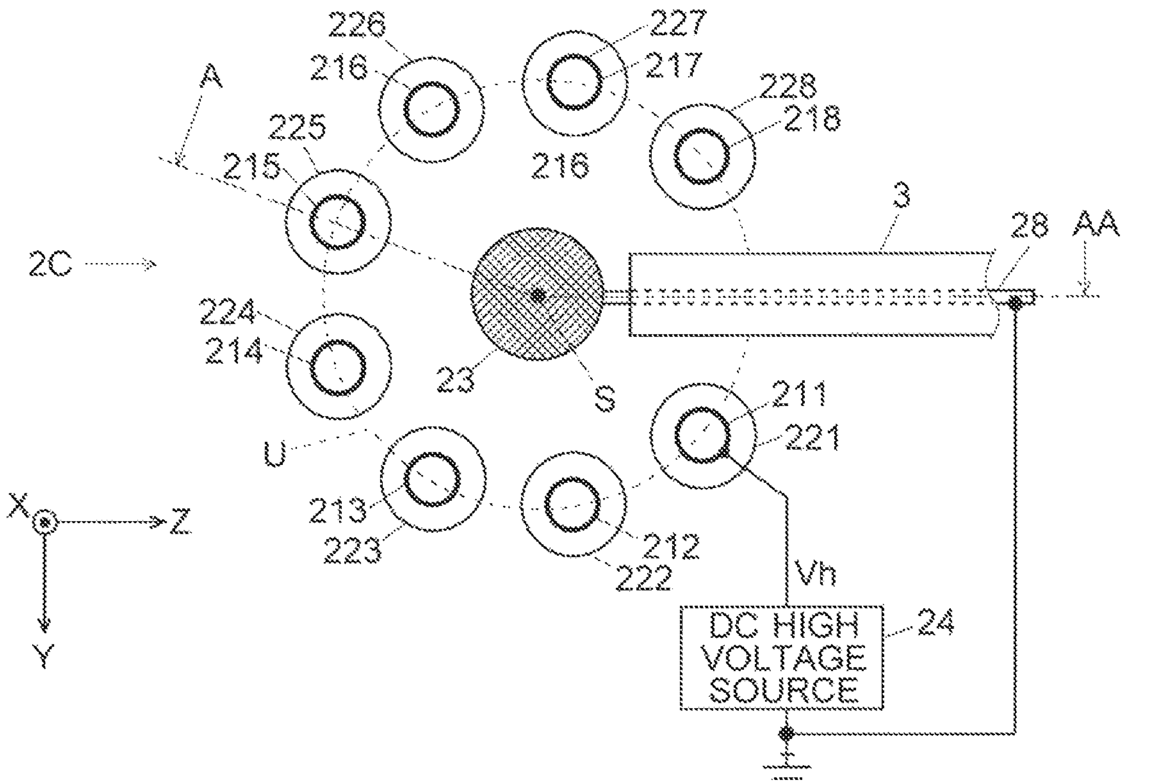
FIG. 5A is a front view of still another modified example of the ESI ion source shown in FIGS. 2A and 2B.
Figure 5B:
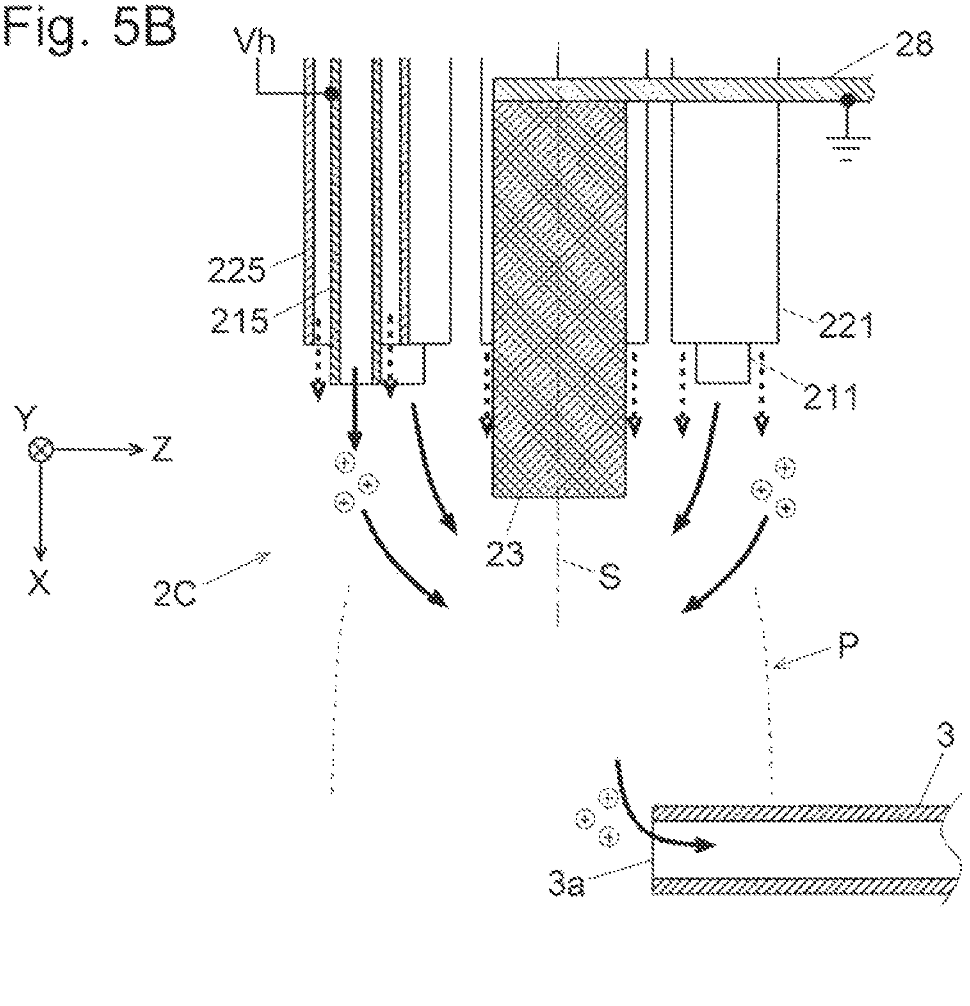
FIG. 5B is a sectional view at line A-AA in FIG. 5A.

Another problem is that the charged droplets sprayed from a capillary located close to the desolvation tube 3 and the ions generated from those droplets are likely to cause contamination by adhering to the ion intake 3*a* of the desolvation tube 3 and the outer surface of its duct line. A modified example of the mass spectrometer according to the previously described embodiment, which is shown in FIGS. 5A and 5B, can deal with these problems. FIG. 5A is a front view of the ESI probe 2C according to the present modified example, and FIG. 5B is a sectional view at line A-AA in FIG. 5A. In FIGS. 5A and 5B, the desolvation tube 3, which is not shown in FIGS. 2A and 2B, is partially shown. In FIGS. 5A and 5B, the same components as shown in FIGS. 2A and 2B are denoted by the same reference signs, and descriptions of those components will be omitted unless particularly necessary.

In this ESI probe 2C, the eight capillaries 211-218 are arranged on the same circle U. Within a range from capillary 211 to capillary 218 extending counterclockwise in FIG. 5A, the capillaries neighboring each other in the circumferential direction are arranged at regular intervals of angle. On the other hand, the interval of angle between the capillary 218 and the neighboring capillary 211 is larger than the other intervals. Specifically, the former angular interval is 40 degrees, while the latter is two times the former one, 80 degrees. The eight capillaries 211-218 in the ESI probe 2C can be considered to have originally been prepared as nine capillaries arranged at regular intervals of angle on the same circle U, from which one capillary was removed, leaving the eight capillaries. The position of the single removed capillary is such that the desolvation tube 3 is present exactly on the extension of the central axis of that capillary.

Therefore, when the positional relationship between the desolvation tube 3 and the capillaries 211-218 is observed on the Y-Z plane as shown in FIG. 5A, the duct line of the desolvation tube 3 is located within the space where none of the capillaries 211-218 is present, i.e., the section where the interval of angle between the two capillaries neighboring each other in the circumferential direction on the circle U is large. Additionally, an electrically conductive electrode holder 28, which is substantially integrated with the auxiliary electrode 23, is located at a position which overlaps the desolvation tube 3 on the Y-Z plane and yet is displaced in the negative direction of the X axis, in order to hold the auxiliary electrode 23 as well as give the ground potential to the same electrode 23.

By the DC high voltage Vh applied to the capillaries 211-218, a strong electric field is created around the tip of each capillary 211-218. The liquid sample distributed to each capillary 211-218 is given electric charges from this electric field and sprayed in the form of charged droplets with the help of the nebulizing gas. This is similar to the case of the mass spectrometer according to the previously described embodiment. In the mass spectrometer according to the present modified example, all capillaries 211-218 are comparatively distant from the desolvation tube 3, so that the electric field created around the tip of each capillary 211-218 is rather unlikely to be affected by the potential of the desolvation tube 3 or the partition wall. Therefore, the charged droplets can be satisfactorily formed at any of those capillaries 211-218, and the ionization is efficiently performed. Furthermore, since the desolvation tube 3 is located so as to avoid the spray flow from any of the capillaries 211-218, the charged droplets in the spray flow or the ions generated from the spray flow are likely to be drawn into the desolvation tube 3 without adhering to the ion intake 3*a* or duct line of the desolvation tube 3. Consequently, the ion collection efficiency is improved.

Thus, a greater amount of ions can be sent to the subsequent stage, and a high level of analysis sensitivity can be achieved. Contamination of the desolvation tube 3 due to the adhesion of the charged droplets and ions to the ion intake 3*a* or duct line can also be reduced. This makes it possible to maintain the performance of the device for a long time and reduce the burden of the maintenance work for the device. Furthermore, since the electrode holder 28 which holds the auxiliary electrode 23 is located within the space where a large interval between the neighboring capillaries is secured, it is possible to hold the auxiliary electrode 23 in a stable manner while assuredly establishing the electric insulation of the electrode holder 28 from the capillaries 211-218 and the nebulizing-gas tubes 221-228.

It is evident that the present modified example also allows for the addition of the heating-gas supplier 25 or 26 as shown in FIG. 3 or 4.

It is not essential that the capillaries neighboring each other in the sections other than the section having the large space be arranged at regular intervals of angle in the previously described manner. The central axis of the ion intake 3*a* of the desolvation tube 3 and the axis S of the ESI probe 2C do not need to be orthogonal but may be oblique to each other.

Other Modifications

The configuration of the ESI probe 2, 2A, 2B or 2C according to the previously described embodiment or its modified examples may be changed or modified in various forms.

For example, the number of capillaries is not limited to the previously mentioned number; any number equal to or greater than two can be appropriately selected. Arranging the plurality of capillaries 211-218 on the same circle U is not essential; they may be arranged in any appropriate form. However, it should be noted that, if the distance from the auxiliary electrode 23 varies from one capillary to another, the strength of the electric field created around the tips of the capillaries will also vary, and the charged droplets sprayed from the capillaries will also significantly vary in size. Therefore, in order to maximally equalize the sizes of the charged droplets and improve the ionization efficiency, it is preferable for the plurality of capillaries 211-218 to be located at equal or close distances from the auxiliary electrode 23.

The shape of the auxiliary electrode 23 is not limited to the columnar shape as described earlier. In particular, the shape of the end of the auxiliary electrode 23 does not need to be a flat shape parallel to the Y-Z plane. By giving the end a hemispherical shape or any other appropriate shape, the potential gradient of the converging electric field can be adjusted so as to improve the convergence of the spray flow.

The number of auxiliary electrodes 23 does not need to be one. A plurality of auxiliary electrodes may be provided.

Figure 6:
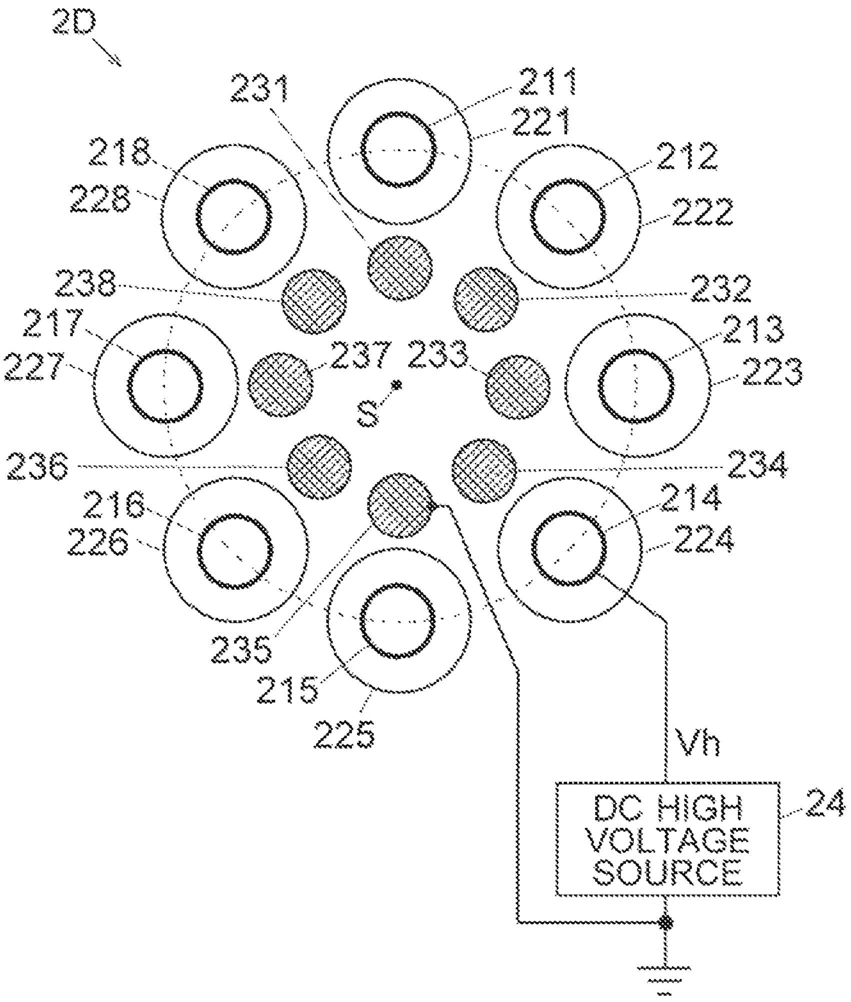
FIG. 6 is a front view of still another modified example of the ESI ion source shown in FIGS. 2A and 2B.

FIG. 6 shows a modified example in which eight auxiliary electrodes 231-238 that respectively correspond to the eight capillaries 211-218 are provided. This figure is a front view of the ESI probe 2 as observed from the same viewpoint as in FIG. 2A. The present configuration can also create a strong DC electric field around the tip of each capillary 211-218, as well as an electric field in which the spray flows of the charged droplets ejected from the capillaries 211-218 are converged into an area around the axis S.

Second Embodiment

Figure 7B:
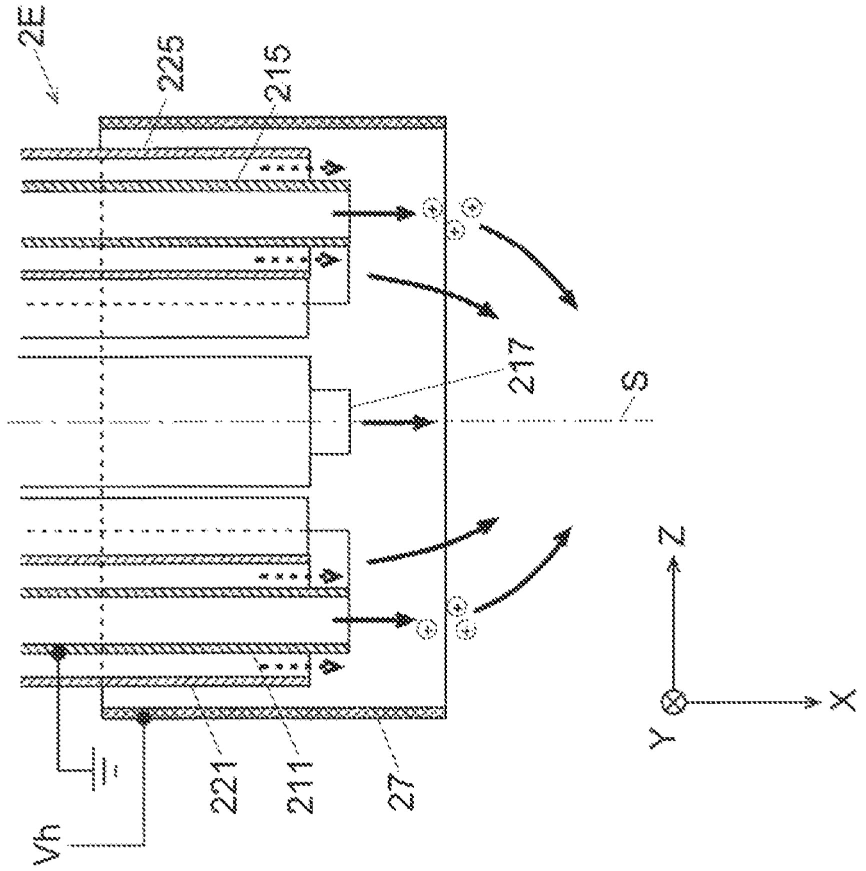
FIG. 7B is a sectional view at line A-AA in FIG. 7A.
Figure 7A:
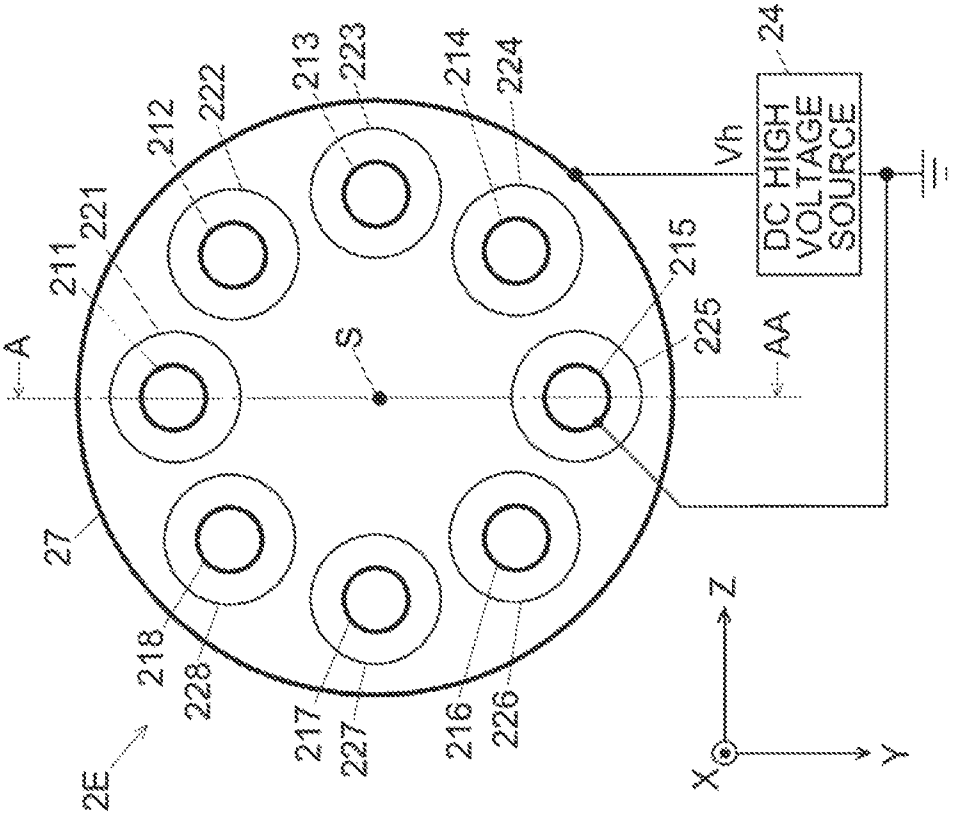
FIG. 7A a front view of an ESI ion source in a mass spectrometer according to another embodiment of the present invention.

A mass spectrometer which is another embodiment of the ion analyzer according to the present invention is hereinafter described. The overall configuration of the present mass spectrometer is identical to that of the device according to the first embodiment, and therefore, will not be described. FIG. 7A is a front view showing the configuration of the ESI ion source in the mass spectrometer according to the present embodiment, and FIG. 7B is a sectional view at line A-AA in FIG. 7A. In FIGS. 7A and 7B, the components which are essentially identical to those of the ESI ion source in the mass spectrometer according to the first embodiment are denoted by the same reference signs, and descriptions of those components will be omitted unless particularly necessary.

In the ESI probe 2E in the present ESI ion source, the configuration and arrangement of the capillaries 211-218 and the nebulizing-gas tubes 221-228 are identical to those of the first embodiment, while the shape and arrangement of the auxiliary electrode as well as the applied voltage are different from those of the first embodiment.

That is to say, the auxiliary electrode 27 is an electrical conductor having a substantially cylindrical shape and arranged so as to surround the capillaries 211-218. The axis of this auxiliary electrode 27 coincides with the axis S of the circle on which the eight capillaries 211-218 are arranged. Accordingly, as in the previously described embodiment, the capillaries 211-218 are at roughly equal distances from the auxiliary electrode 27.

The eight capillaries 211-218 are all grounded (it should be noted that only the ground wire connected to one capillary 215 is shown in FIG. 7A in order to prevent the drawing from being overly complex). On the other hand, a DC high voltage equal to or higher than several kV, for example, is applied from the DC high voltage source 24 to the auxiliary electrode 27. The polarity of this voltage is identical to that of the ion which is the measurement target; when the measurement target is a positive ion, the DC high voltage is a positive voltage.

When a liquid sample is introduced into each of the capillaries 211-218, the positive DC high voltage is applied to the auxiliary electrode 27. Due to the closeness of the capillaries 211-218 to the auxiliary electrode 27, a strong electric field is created around the tip of each capillary 211-218. Therefore, the charged droplets formed at the tips of the capillaries 211-218 are easily atomized. Consequently, with the help of the nebulizing gas, a large amount of charged droplets is sprayed from the capillaries 211-218.

These charged droplets have positive charges. Since the voltage applied to the auxiliary electrode 27 surrounding the eight capillaries 211-218 is a positive high voltage, an electric field which acts on the positively charged droplets (and positive ions ejected from those droplets) so as to push them inwards, i.e., toward the axis 5, is created. Therefore, as in the first embodiment, although a Coulomb repulsion force acts between the charged droplets, the spray flow of the charged droplets does not easily spread but is converged into an area around the axis S. Consequently, the ions efficiently generated from the charged droplets are efficiently drawn into the desolvation tube 3 and transported to the subsequent stage.

The second embodiment also allows for various modifications similar to those of the first embodiment.

That is to say, similar to the configurations shown in FIGS. 3 and 4, a doughnut-shaped heating-gas supplier 25 surrounding the auxiliary electrode 27 may be added, or a heating-gas supplier 26 configured to spout a heating gas across the spray flow P of the charged droplets coming from the capillaries 211-218 may be added.

The number and arrangement of the capillaries may be appropriately changed. The shape of the auxiliary electrode 27 is not limited to a cylindrical shape. The auxiliary electrode 27 may consist of an appropriate number of segments.

The first and second embodiments as well as their modified examples are mere examples of the present invention, and any change, modification or addition appropriately made within the gist of the present invention will naturally be included within the scope of claims of the present application.

For example, the previously described embodiments are concerned with a single-type quadrupole mass spectrometer.

However, as noted earlier, it is possible to appropriately select the technique for the mass separation, the presence/absence of an ion-dissociating operation and the type of dissociation technique, as well as other related elements. Therefore, it is naturally possible to apply the present invention in various types of mass spectrometers, such as a time-of-flight mass spectrometer, ion trap mass spectrometer, triple quadrupole mass spectrometer, quadrupole time-of-flight mass spectrometer, or ion trap time-of-flight mass spectrometer.

The present invention is generally applicable in any type of ion analyzer in which an ESI ion source is used to ionize sample components. Accordingly, the device is not limited to mass spectrometers; for example, it may be an ion mobility spectrometer or an ion mobility mass spectrometer which is a combination of an ion mobility spectrometer and a mass spectrometer.

Various Modes

A person skilled in the art can understand that the previously described illustrative embodiments are specific examples of the following modes of the present invention.

(Clause 1) One mode of the ion analyzer according to the present invention is an ion analyzer equipped with an ion source employing an ESI method, where the ion source includes:

- a plurality of capillaries configured to spray a supplied liquid sample in the same direction;
- one or more auxiliary electrodes arranged so as to be surrounded by the plurality of capillaries; and
- a voltage supplier configured to apply, to the plurality of capillaries, a DC high voltage for which the potential of the one or more auxiliary electrodes is used as a reference.

(Clause 10) Another mode of the ion analyzer according to the present invention is an ion analyzer equipped with an ion source employing an ESI method, where the ion source includes:

- a plurality of capillaries configured to spray a supplied liquid sample in the same direction;
- one or more auxiliary electrodes arranged so as to surround the plurality of capillaries; and
- a voltage supplier configured to apply, to the one or more auxiliary electrodes, a DC high voltage for which the potential of the plurality of capillaries is used as a reference.

In the ion analyzers described in Clauses 1 and 10, a liquid sample containing a component to be analyzed is distributed to a plurality of capillaries, and electrically charged droplets are sprayed from each capillary. Accordingly, the total amount of liquid sample to be introduced into the ion source can be increased, whereby the throughput of the analysis can be improved. Alternatively, the amount of liquid sample to be passed through one capillary can be decreased, whereby the sprayed droplets can be atomized, and the generation of the ions can be promoted.

In the ion analyzers described in Clauses 1 and 10, the electric field around the tip of the capillary is strengthened by arranging the auxiliary electrode close to the capillaries. Therefore, the charge-induced splitting of the liquid sample which has reached the tips of the capillaries is promoted, and the ionization efficiency is thereby improved. Simultaneously, due to the effect of the electric field created by the auxiliary electrode, the charged droplets sprayed from the capillaries and the ions generated from those droplets are prevented from spreading; conversely, they are converged as they move forward. Therefore, the generated ions are more likely to be introduced, for example, into a transport tube which transports ions into a vacuum chamber, so that the ion collection efficiency is improved. Consequently, the amount of ions subjected to the analysis increases, and a high level of analysis sensitivity is achieved.

(Clauses 2 and 11) In the ion analyzer described in Clause 1 or 10, the ion source may further include nebulizing-gas tubes provided so that each of the plurality of capillaries has one nebulizing-gas tube configured to spout a nebulizing gas in the same direction as the direction in which the liquid sample is sprayed from the capillaries.

The ion analyzers described in Clauses 2 and 11 can satisfactorily spray charged droplets from the tips of the capillaries.

(Clause 3) The ion analyzer described in Clause 1 or 2 may be configured as follows:

- the plurality of capillaries are arranged on substantially the same circle; and
- the one or more auxiliary electrodes are a single electrode located at a substantially-central position of the circle on which the plurality of capillaries are arranged.

(Clause 12) Similarly, ion analyzer described in Clause 10 or 11 may be configured as follows:

- the plurality of capillaries are arranged on substantially the same circle; and
- the one or more auxiliary electrodes are a single electrode having a cylindrical shape coaxial with the circle on which the plurality of capillaries are arranged.

In the ion analyzers described in Clauses 3 and 12, since the strength of the electric field around the tips of the capillaries are roughly equal, the charged droplets atomized to roughly equal extents can be sprayed from all capillaries. This improves the ionization efficiency. Additionally, in the ion analyzers described in Clauses 3 and 12, due to the potential of the capillaries and that of the auxiliary electrode, the potential gradient of the electric field within the area where the spray flow of the charged droplets is formed becomes roughly rotation-symmetrical with respect to the axis of the spray flow. Therefore, the spray flow of the charged droplets can be easily converged into an area around that axis, which improves the efficiency of the use of the ions generated from the charged droplets. Thus, a greater amount of ions can be subjected to the analysis, and the analysis sensitivity can be further improved.

(Clause 4) The ion analyzer described in Clause 3 may further include an ion transport tube configured to collect ions generated from the spray flow coming from the plurality of capillaries and transport the ions to a subsequent stage, the ion transport tube having an ion intake in front of the spray flow and including a duct line extending in a direction intersecting with the direction of spray from the capillaries, where the plurality of capillaries are arranged on substantially the same circle except for a position where the ion transport tube is located on the extension of the direction of spray.

(Clause 5) In the ion analyzer described in Clause 4, the duct line of the ion transport tube may extent a direction substantially orthogonal to the direction of spray from the capillaries.

In normal cases, the potential of the ion transport tube is set at the ground potential or a potential comparatively close to it. Due to the influence of this potential, the electric field created around the tip of a capillary located close to the ion transport tube is likely to be weakened. In addition, the charged droplets sprayed from a capillary located close to the ion transport tube, and the ions generated from those droplets, are less likely to be carried by the gas stream and taken into the ion transport tube. By comparison, in the ion analyzers described in Clauses 4 and 5, since all capillaries are comparatively distant from the ion transport tube, a strong electric field is created around the tip of each capillary, and the charged droplets can be satisfactorily produced. Furthermore, the charged droplets contained in the spray flow, and the ions generated from those droplets, are efficiently taken into the ion transport tube. Thus, a greater amount of ions can be sent to the subsequent stage, and the analysis sensitivity can be improved. Contamination of the ion transport tube and its ion intake due to the adhesion of the charged droplets and ions can also be reduced.

(Clause 6) The ion analyzer described in Clause 4 or 5 may be configured as follows:

the plurality of capillaries are arranged so that the spacing of the capillaries neighboring each other in the circumferential direction on the circle is largest at a position where the ion transport tube is located on the extension of the direction of spray; and a holder which holds the auxiliary electrode and/or a wiring which gives a potential to the auxiliary electrode is located in a space where the spacing of the capillaries neighboring each other is largest.

In the ion analyzer described in Clause 6, the holder and/or wiring for the auxiliary electrode can be arranged in a sufficiently large space between the neighboring capillaries, so that the electric insulation between the holder or wiring and the capillaries can be satisfactorily ensured.

(Clauses 7 and 13) The ion analyzer described in one of Clauses 1-6 or one of Clauses 10-12 may further include a heating-gas supplier configured to blow a heating gas onto an outer circumferential portion of the spray flow coming from the plurality of capillaries, so as to wrap the spray flow.

In the ion analyzers described in Clauses 7 and 13, the heating gas spouted from the heating-gas supplier mainly hits the outer circumferential portion of the spray flow of the charged droplets ejected from the plurality of capillaries. In this portion of the spray flow, there are comparatively large-sized charged droplets. The heating gas promotes the vaporization of the solvent in these charged droplets and effectively improves the ionization efficiency. Since the flow of the heating gas is formed so as to wrap the spray flow of the charged droplets, the spread of the spray flow will be even more reduced, and the efficiency of the use of the ions will be further improved.

(Clauses 8 and 14) The ion analyzer described in one of Clauses 1-6 or one of Clauses 10-12 may further include a heating-gas supplier configured to blow a heating gas onto the spray flow coming from the plurality of capillaries so that the heating gas flows across the spray flow.

In the ion analyzers described in Clauses 8 and 14, the heating gas spouted from the heating-gas supplier mainly hits the outer circumferential portion of the spray flow of the charged droplets ejected from the plurality of capillaries. In this portion of the spray flow, there are comparatively large-sized charged droplets. The heating gas promotes the vaporization of the solvent in these charged droplets and effectively improves the ionization efficiency.

(Clauses 9 and 15) The ion analyzer described in one of Clauses 1-8 or one of Clauses 10-14 may be a single-type quadrupole mass spectrometer, triple quadrupole mass spectrometer, or quadrupole time-of-flight mass spectrometer including the ion source.

In these types of mass spectrometers, it is necessary to transport ions form the ion source, which is at atmospheric pressure, to the vacuum chamber in the subsequent stage through a desolvation tube, sampling cone or similar part. The ion analyzers described in Clauses 9 and 15 can efficiently collect ions generated in the ion source and transport them to the subsequent stage. Thus, the ion analyzers described in Clauses 9 and 15 can achieve a high level of analysis sensitivity.

REFERENCE SIGNS LIST

1 . . . Chamber
11 . . . Ionization Chamber
12 . . . First Intermediate Vacuum Chamber
13 . . . Second intermediate Vacuum Chamber
14 . . . Analysis Chamber
2, 2A, 2B, 2C, 2D, 2E . . . Electrospray Ionization (ESI) Probe
211-218 . . . Capillary
221-228 . . . Nebulizing-Gas Tube
23, 231-238, 27 . . . Auxiliary Electrode
24 . . . DC High Voltage Source
25, 26 . . . Heating-Gas Supplier
251 . . . Heating-Gas Spouting Port
28 . . . Electrode Holder
3 . . . Desolvation Tube
4, 6 . . . Ion Guide
5 . . . Skimmer
7 . . . Quadrupole Mass Filter
8 . . . Ion Detector

The invention claimed is:

1. An ion analyzer equipped with an ion source employing an electrospray ionization method, wherein the ion source includes:

a plurality of capillaries configured to spray a supplied liquid sample in a same direction;

one or more auxiliary electrodes arranged so as to be surrounded by the plurality of capillaries; and a voltage supplier configured to apply, to the plurality of capillaries, a DC high voltage for which a potential of the one or more auxiliary electrodes is used as a reference.

2. The ion analyzer according to claim 1, wherein the ion source further includes nebulizing-gas tubes provided so that each of the plurality of capillaries has one nebulizing-gas tube configured to spout a nebulizing gas in a same direction as the direction in which the liquid sample is sprayed from the capillaries.

3. The ion analyzer according to claim 1, wherein:

the plurality of capillaries are arranged on substantially a same circle; and the one or more auxiliary electrodes are a single electrode located at a substantially central position of the circle on which the plurality of capillaries are arranged.

4. The ion analyzer according to claim 3, further comprising an ion transport tube configured to collect ions generated from a spray flow coming from the plurality of capillaries and transport the ions to a subsequent stage, the ion transport tube having an ion intake in front of the spray flow and including a duct line extending in a direction intersecting with the direction of spray from the capillaries, where the plurality of capillaries are arranged on substantially the same circle except for a position where the ion transport tube is located on an extension of the direction of spray.

5. The ion analyzer according to claim 4, wherein the duct line of the ion transport tube extends in a direction substantially orthogonal to the direction of spray from the capillaries.

6. The ion analyzer according to claim 4, wherein:

the plurality of capillaries are arranged so that a spacing of the capillaries neighboring each other in a circumferential direction on the circle is largest at a position where the ion transport tube is located on the extension of the direction of spray; and a holder which holds the auxiliary electrode and/or a wiring which gives a potential to the auxiliary electrode is located in a space where the spacing of the capillaries neighboring each other is largest.

7. The ion analyzer according to claim 1, further comprising a heating-gas supplier configured to blow a heating gas onto an outer circumferential portion of a spray flow coming from the plurality of capillaries, so as to wrap the spray flow.

8. The ion analyzer according to claim 1, further comprising a heating-gas supplier configured to blow a heating gas onto a spray flow coming from the plurality of capillaries so that the heating gas flows across the spray flow.

9. The ion analyzer according to claim 1, wherein the ion analyzer is a single-type quadrupole mass spectrometer, triple quadrupole mass spectrometer, or quadrupole time-of-flight mass spectrometer including the ion source.

10. An ion analyzer equipped with an ion source employing an electrospray ionization method, wherein the ion source includes:

a group of a plurality of capillaries configured to spray a supplied liquid sample in a same direction;

a group of one or more auxiliary electrodes, where one of the group of the plurality of capillaries and the group of the one or more auxiliary electrodes is arranged so as to surround the other; and a voltage supplier configured to apply a DC high voltage to the one such that a downward potential gradient is formed from the one to the other.

* * * * *